United States Patent [19]
Lynch et al.

[11] Patent Number: 5,264,907
[45] Date of Patent: Nov. 23, 1993

[54] OUTPUT OPTICS FOR LASER VELOCIMETERS

[75] Inventors: Dana H. Lynch, San Francisco; William D. Gunter, San Jose; Kenneth W. McAlister, Santa Clara, all of Calif.

[73] Assignee: The United States of America as represented by the Administrator of the National Aeronautics and Space Administration, Washington, D.C.

[21] Appl. No.: 691,602

[22] Filed: Apr. 17, 1991

[51] Int. Cl.$^5$ .................................. G01P 3/36
[52] U.S. Cl. ......................... 356/28.5; 359/362
[58] Field of Search ............... 356/28.5; 359/362

[56] References Cited

U.S. PATENT DOCUMENTS

| | | | |
|---|---|---|---|
| 3,895,872 | 7/1975 | Dandliker et al. | |
| 4,632,548 | 12/1986 | Gunter, Jr. | 356/28.5 |
| 4,697,922 | 10/1987 | Gunter, Jr. | 356/28.5 |
| 4,758,068 | 7/1988 | Gughton et al. | 350/321 |
| 4,823,014 | 4/1989 | Miyawaki | 250/561 |
| 5,040,886 | 8/1991 | Gunter | 359/572 |
| 5,077,622 | 12/1991 | Lynch et al. | 359/813 |

Primary Examiner—Stephen C. Buczinski
Attorney, Agent, or Firm—Darrell G. Brekke; Guy Miller; John R. Manning

[57] ABSTRACT

Space savings are effected in the optical output system of a laser velocimeter. The output system comprises pairs of optical fibers having output ends from which a beam of laser light emerges, a transfer lens for each light beam, and at least one final (LV) lens for receiving the light passing through the transfer lenses and for focussing that light at a common crossing point or area. In order to closely couple the transfer lenses to the final lens, each transfer lens is positioned relative to the final lens receiving light therefrom such that the output waist of the corresponding beam received by the final lens from the transfer lens is a virtual waist located before the transfer lens.

3 Claims, 1 Drawing Sheet

OUTPUT OPTICS FOR LASER VELOCIMETERS

ORIGIN OF THE INVENTION

The invention described herein was made in the performance of work under a NASA contract and is subject to Public Law 96-517 (35 U.S.C. 200 et seq.). The contractor has not elected to retain title to the invention.

BACKGROUND OF THE INVENTION a. Technical Field of the Invention

The present invention relates to laser velocimeters and, more particularly, an improvement in the output for transmitting optics for such devices.

b. Description of the Prior Art

Typical prior art laser velocimeter devices employ one or more pairs of single-mode optical fibers for coupling the laser beam to a transfer lens, one such transfer lens being provided for each beam. The beam then passes through a final lens (the laser velocimeter (LV) lens) which provides appropriate focussing thereof. More particularly, as explained in more detail below, the pairs of optical fibers are disposed with the axes thereof all parallel to each other at the output end and the light emerging from each fiber expands from the beam waist located at the output end of the fiber until the beam reaches the transfer lens. After passing through the transfer lens, the light narrows to a second beam waist (the transfer waist) and thereafter expands until striking the LV lens. Because the beams approaching the LV lens are mutually parallel, the beams cross each other at distance equal to one focal length of the LV lens beyond that lens. It is necessary in order to provide accurate LV measurements for all of the beams to have the waists thereof located at the common crossing point and this will occur if the transfer waists of the beams are properly located at a distance of one focal length of the LV lens before, i.e., behind or upstream of, the lens.

A serious disadvantage of the prior art is that if the laser beams are properly managed and arranged with respect to the size and location of the beam waist, the overall device is basically limited to small working distances (corresponding to the focal lengths of the LV lens) in that if longer working distances are desired, the overall configuration of the output optics is of impractical length. In other words, compact optical configurations featuring both proper management of the beam waists as described above and long working distances are not compatible with the techniques embodied in the prior art.

Considering other disadvantages of long working distances, it is noted that the alignment of the output ends of all fibers and the axes of all transfer lenses must be established and maintained with respect to the LV lens, and this places a great demand on the mechanical resolution and rigidity of the mounting devices for these optical elements when the optical elements are separated by long distances.

Further in this regard, it will be appreciated that a typical reason for using fibers in transmitting of optics is to enable the LV lens to be placed in scanning motion while the laser and the remainder of the beam-handling optics remain fixed. Such an arrangement significantly reduces the number of optical elements that must be subjected to extensive changes in the orientation of the scanning apparatus as well as to any attendant vibrations. However, a lengthy coupling path into the LV lens is an obvious disadvantage in such a scanning arrangement.

As is evident from the foregoing discussion, a long working path is a serious disadvantage for several reasons and the need for a long working path is tied to location of the transfer waist and hence to the requirement that a transfer lens be employed. Thus, it might at first appear that the problem could be solved by simply omitting the transfer lens at least in some special applications. In practice, however, it is unlikely that parameters such as the beam waist leaving the fiber, the required diameter of the measurement volume where the beams cross and the focal length of the LV lens could ever be made to be compatible without the provision of a transfer lens to provide adjustment of the waist size.

U.S. Pat. No. 3,895,872 (Dandliker et al) discloses an optical speed measuring device of background interest while the following patents are also of possible interest: U.S. Pat. No. 4,167,329 (Jelalian et al); U.S. Pat. No. 4,556,284 (Albersdoerfer et al); U.S. Pat. No. 4,705,367 (Eckbreth et al); and U.S. Pat. No. 4,753,421 (Deserns).

SUMMARY OF THE INVENTION

In accordance with the present invention, an improvement is provided in the transmitting optics of a laser velocimeter which results in a short or close-coupling path between the optical fibers and the last (LV) lens of the velocimeter so as to economize on the space required for the transmitting optics. The improvement concerns the use of a specially positioned transfer lens that produces an output waist at an advantageous location relative to the LV lens. More particularly, instead of being a real waist located beyond the transfer lens as in the prior art, the output waist is a virtual waist on the side before, i.e., behind or upstream of, the transfer lens.

The invention permits the final elements or components of the transmitting optics, i.e., the transfer lens and final lens, to be placed very close together in terms of distance along the axis of symmetry of the optical system. Such a compact arrangement is amenable to applications requiring a light weight assembly and enables optical alignment to be more accurately maintained. It will be understood that there are some applications where the compact construction provided by the invention is of critical importance, e.g., in facilities where the space between the test section and the surrounding plenum chamber is quite cramped, in that it would be very difficult if not impossible to establish a long focal length system in such an environment.

Other features and advantages of the invention will be set forth in, or apparent from, the following detailed description of a preferred embodiment of the invention.

DETAILED DESCRIPTION OF THE INVENTION

Figure 1:
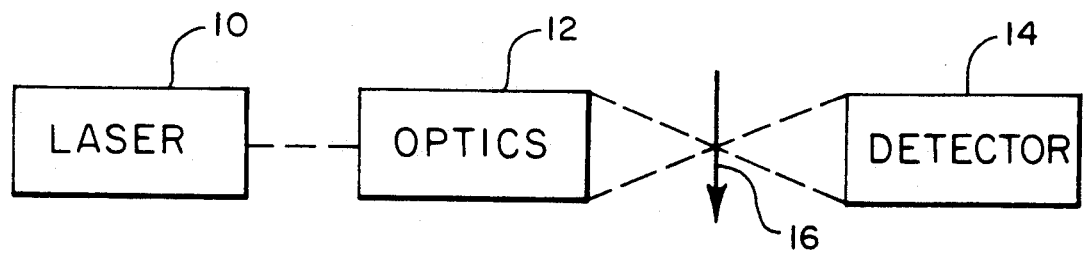
FIG. 1 is a highly simplified block diagram of the basic units of a laser velocimeter.

Referring first to FIG. 1, the basic units of a laser velocimeter are shown. These units or elements include a laser source 10, beam forming and transmitting optics 12 and a detector 14. In this implementation, a moving volume (indicated by arrow 16) the velocity of which is to be measured, is located at the common crossover point of the output beam or beams and the light reflected or scattered by the moving volume 16, as detected by detector 14, is a measure of the velocity thereof.

Figure 2:
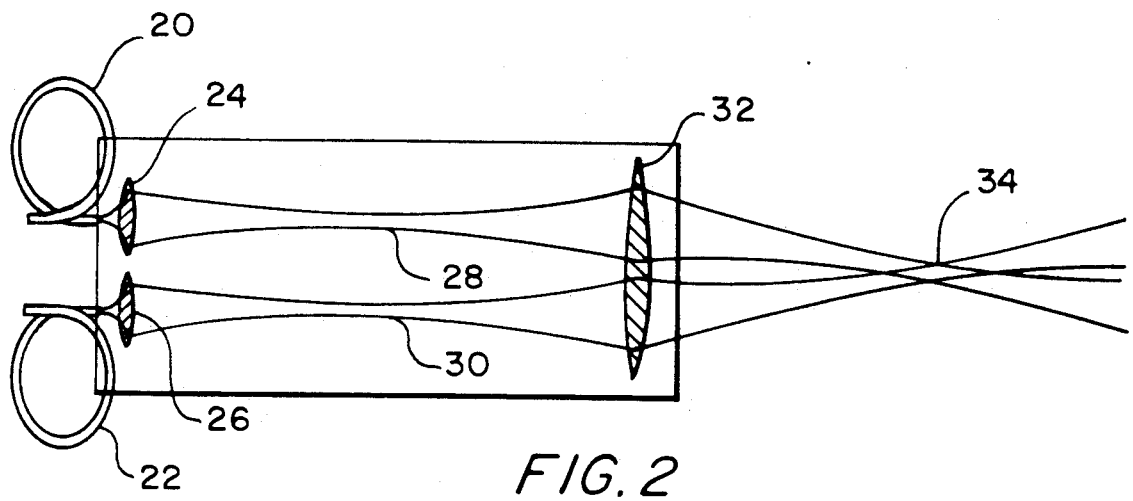
FIG. 2 is a schematic side elevational view of the transmitting optics of a prior art laser velocimeter.

Before considering the present invention, reference is first made to FIG. 2, which illustrates the basic components of the output optics of a laser velocimeter, i.e., a portion of the optics 12 of FIG. 1. In the implementation illustrated, first and second single mode fibers 20 and 22 are disposed with the axes thereof mutually parallel at the output end, as shown. First and second transfer lenses 24 and 26 are disposed downstream of fibers 20 and 22 so as to respectively receive the light beams emerging therefrom. As illustrated, the light beams from each of the fibers 20 and 22 expand from the beam waist located at the output end of the corresponding fibre until reaching the associated transfer lens and, after passing through that lens, the beam of light narrows to a second beam waist, referred to as the transfer waist. The transfer waists for the beams passing through transfer lenses 24 and 26 are indicated at 28 and 30, respectively.

After the transfer waist, the beams expand again and strike a common LV lens 32 at equal radii from the center of lens 32 but at different azimuthal positions. Because the beams approaching the LV lens 32 are mutually parallel, the beams all cross each other at a distance equal to one focal length of the LV lens 32 beyond that lens, i.e., at point or area 34. As explained above, it is necessary in order to provide proper LV measurements for the waists of all of the beams to be located at point 32 and this will occur if the transfer waists 28 and 30 are located at one focal length of the LV lens 32 before the lens 32, i.e., upstream of the lens.

The space consuming disadvantage of the requirement that the beam transfer waists be located one focal length in front of the LV lens (corresponding to lens 32) was discussed above. Considering a practical example, in a system wherein optical fibers are to be coupled with two LV lenses, each having a focal length of 2286 mm, a system constructed in accordance with the prior art would dictate that the distance between each fiber (corresponding to fibers 20 and 22) and the LV lens (corresponding to lens 32) be composed of (i) the distance from the fiber to transfer lens (e.g., lens 24 or 26) plus (ii) the distance between the transfer lens and the transfer waist plus (iii) the distance of 2286 mm between the transfer waist and the LV lens. The total or accumulated distance for each LV lens system is about 2.5 meters and it will be appreciated this amounts to a sizeable space and alignment burden on the scanning apparatus of the velocimeter system.

Figure 3:
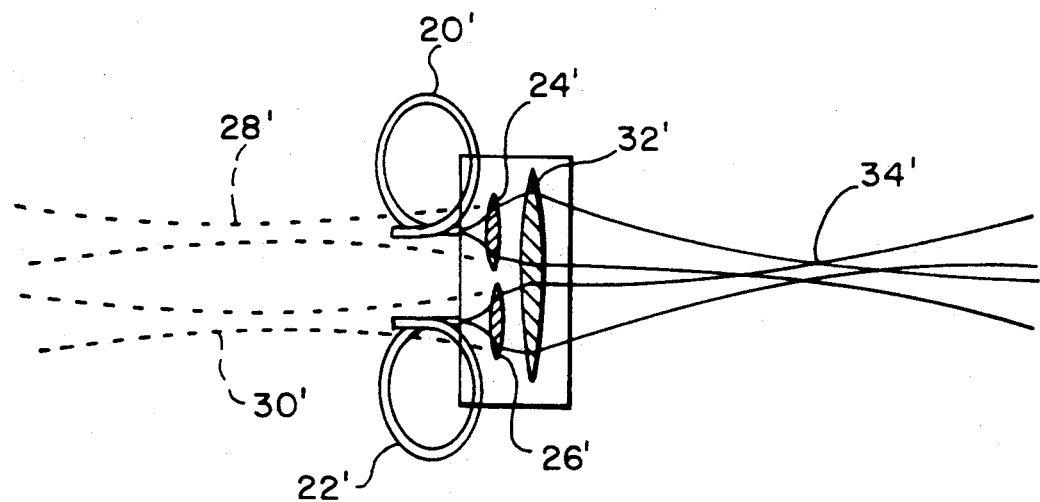
FIG. 3 is a schematic side elevational view, similar to that of FIG. 2, of the transmitting optics of a laser velocimeter constructed in accordance with the present invention.

Referring to FIG. 3, the output optics of a velocimeter constructed in accordance with the present invention are shown. The components of FIG. 3 are similar to those of FIG. 2 and like components have been given the same reference numerals with primes attached. In accordance with the invention, the transfer lenses 24' and 26' are positioned relative to LV lens 32', such that an output waist is formed at an advantaged location relative to lens 32' and, in particular, the transfer waists 28' and 30', rather than being real waists that are located beyond the corresponding lenses 24' and 26' as in the prior art (and as was described above in connection with FIG. 2), are virtual waists, as indicated at 28' and 30', on the side of optical system in advance of lenses 24' and 26'.

As a consequence of this arrangement, lenses 24' and 26' can be placed very close to LV lens 32' in terms of distance along the axis of symmetry. Accordingly, as discussed above, this compact arrangement is more amenable to applications which require a light weight construction as well as a more accurately maintained alignment. It will be appreciated that, as mentioned above, in some applications a more compact design can be more than a convenience, i.e., in facilities where the space between the test section and the surrounding plenum chamber is quite cramped and thus a long focal length system is unsuitable.

Although the present invention has been described relative to specific exemplary embodiments thereof, it will be understood by those skilled in the art that variations and modifications can be effected in these exemplary embodiments without departing from the scope and spirit of the invention.

What is claimed is:

1. In a laser velocimeter including an optical output system comprising at least one pair of optical fibers having output ends from which a beam of laser light emerges, a positive transfer lens for each said laser light beam through which passes the beam from the output end of a respective optical fiber, and at least one final lens for receiving the light passing through both said transfer lenses and for focussing that light at a common crossing point, the improvement wherein each said positive transfer lens is positioned relative to the final lens receiving light therefrom such that the output waist of the corresponding beam received by the final lens from the transfer lens is a virtual waist located in front of the transfer lens.

2. A laser velocimeter system including a laser source for producing a laser beam; a beam shaping and transmitting optical assembly for processing the laser beam to produce an output beam; and a detector for receiving light from the output beam that is reflected or refracted by a moving volume the velocity of which is to be detected; said optical assembly including at least one pair of single-mode optical fibers all having the axes thereof parallel to each other at the output end of the fibers and through each of which passes a light beam derived from said laser beam, a final lens for providing that the output waists of light beams which pass therethrough are all located at a common crossing point at a distance along the axis of symmetry of the final lens equal to the focal length of the final lens, and a positive transfer lens located at the output end of each optical fiber and positioned relative to said final lens such that the transfer waist of the light passing through the transfer lens is a virtual waist located in front of the positive transfer lens and spaced in front of the final lens a distance along the axis of symmetry of the final lens equal to the focal length of the final lens.

3. In a laser velocimeter system including a laser source for producing a laser beam; a beam shaping and transmitting optical system for processing the laser beam to produce an output beam; and a detector for receiving light from the output beam that is reflected or refracted by a moving volume the velocity of which is to be detected; said optical system comprising first and second optical fibers having the axes thereof parallel to each other at the output end of the fibers and through each of which passes a light beam derived from said laser beam, first and second positive transfer lenses respectively located at the output ends of said first and second fibers each receiving a light beam from the corresponding fiber and providing a beam having a virtual transfer waist located in front of the transfer lens, and a final lens, having a focal length and an axis of symmetry, and being spaced from said virtual waist a distance along said axis of symmetry equal to the focal length of said final lens, for receiving light beams from said positive transfer lenses and for providing that the output waists of the light beams received from the transfer lenses after passing through said final lens are all located at a common crossing point at a distance along the axis of symmetry of the final lens equal to the focal length of the final lens.

* * * * *